United States Patent
Previdi et al.

(10) Patent No.: US 7,554,996 B2
(45) Date of Patent: Jun. 30, 2009

(54) CONTROLLED DISTRIBUTION OF INTER-AREA ROUTING INFORMATION

(75) Inventors: Stefano B. Previdi, Rome (IT); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 669 days.

(21) Appl. No.: 11/226,889

(22) Filed: Sep. 14, 2005

(65) Prior Publication Data

US 2007/0058568 A1   Mar. 15, 2007

(51) Int. Cl.
*H04L 12/28* (2006.01)
(52) U.S. Cl. .................. 370/401; 370/241; 370/248; 370/252; 370/254; 370/351; 370/389; 370/395.5; 370/400; 370/408; 709/232; 709/238; 709/242
(58) Field of Classification Search .......... 370/401, 370/409, 392, 235, 238, 248, 251, 254, 351, 370/389, 395.5, 400; 709/224, 225, 227, 709/232, 238, 242
See application file for complete search history.

(56) References Cited

U.S. PATENT DOCUMENTS

| | | | |
|---|---|---|---|
| 5,088,032 A | 2/1992 | Bosack | |
| 6,392,997 B1 | 5/2002 | Chen | |
| 6,473,421 B1 | 10/2002 | Tappan | |
| 6,584,093 B1 | 6/2003 | Salama et al. | |
| 6,603,756 B1 | 8/2003 | Tappan | |
| 6,643,706 B1 | 11/2003 | Marques et al. | |
| 6,665,273 B1 | 12/2003 | Goguen et al. | |
| 6,850,518 B1 | 2/2005 | Khanna | |
| 6,931,441 B1 | 8/2005 | Roden | |
| 6,950,427 B1 * | 9/2005 | Zinin | 370/386 |
| 7,139,278 B2 * | 11/2006 | Gibson et al. | 370/401 |
| 7,215,644 B2 * | 5/2007 | Wu et al. | 370/248 |

(Continued)

OTHER PUBLICATIONS

U.S. Appl. No. 10/767,574, filed Sep. 18, 2003, entitled Computing Inter-Autonomous System MPLS Traffic Engineering LSP Paths, by Vasseur et al.

(Continued)

*Primary Examiner*—Aung S Moe
*Assistant Examiner*—Abdullah Riyami
(74) *Attorney, Agent, or Firm*—Cesari and McKenna LLP

(57) ABSTRACT

A technique controls distribution of reachability information for a tail-end node of a traffic engineering (TE) label switched path (LSP) to a head-end node of the TE-LSP in a computer network. The TE-LSP preferably spans multiple domains of the network such that the tail-end node resides in a domain ("tail-end domain") that is different (remote) from the domain of the head-end node ("head-end domain"). According to the inter-domain information distribution technique, the head-end node requests the remote reachability information from the tail-end node, which may employ an Interior Gateway Protocol (IGP) to transmit the information to a border router of the tail-end domain. The tail-end domain border router then shares this information with at least a head-end domain border router. The head-end node thereafter requests that the head-end domain border router release the reachability information into the head-end domain. The head-end node uses the remote information to calculate routes, i.e., address prefixes and associated attributes, reachable from the tail-end node for insertion into its routing table.

15 Claims, 10 Drawing Sheets

U.S. PATENT DOCUMENTS

| | | | |
|---|---|---|---|
| 2002/0163884 A1* | 11/2002 | Peles et al. ................. 370/229 |
| 2003/0185217 A1* | 10/2003 | Ganti et al. .............. 370/395.5 |
| 2004/0039840 A1* | 2/2004 | Dispensa et al. ............ 709/242 |
| 2004/0081154 A1 | 4/2004 | Kouvelas |
| 2004/0111529 A1* | 6/2004 | Parmar ....................... 709/245 |
| 2004/0215820 A1 | 10/2004 | Blair |
| 2006/0114916 A1* | 6/2006 | Vasseur et al. .............. 370/397 |
| 2006/0126502 A1* | 6/2006 | Vasseur et al. .............. 370/221 |
| 2006/0153067 A1* | 7/2006 | Vasseur et al. .............. 370/217 |
| 2006/0171320 A1* | 8/2006 | Vasseur et al. .............. 370/238 |
| 2006/0176820 A1* | 8/2006 | Vasseur et al. .............. 370/241 |
| 2006/0179158 A1* | 8/2006 | Randriamasy et al. ...... 709/238 |
| 2006/0198308 A1* | 9/2006 | Vasseur et al. .............. 370/238 |
| 2006/0200579 A1* | 9/2006 | Vasseur et al. .............. 709/238 |
| 2006/0209716 A1* | 9/2006 | Previdi et al. ................ 370/254 |
| 2006/0215579 A1* | 9/2006 | Nadeau et al. .............. 370/254 |
| 2006/0233181 A1* | 10/2006 | Raszuk et al. ............... 370/401 |
| 2006/0268681 A1* | 11/2006 | Raza .......................... 370/216 |
| 2007/0014293 A1* | 1/2007 | Filsfils et al. ............... 370/392 |
| 2007/0019558 A1* | 1/2007 | Vasseur et al. .............. 370/248 |
| 2007/0047469 A1* | 3/2007 | Vasseur et al. .............. 370/255 |
| 2007/0124497 A1* | 5/2007 | D'Souza et al. ............. 709/238 |
| 2008/0155121 A1* | 6/2008 | Jamieson et al. ............ 709/242 |

OTHER PUBLICATIONS

U.S. Appl. No. 11/001,349, filed Dec. 1, 2004, entitled Propagation of Routing Information in RSVP-TE for Inter-Domain TE-LSPS, by Vasseur et al.

U.S. Appl. No. 11/001,459, filed Dec. 1, 2004, entitled Inter-Domain TE-LSP With IGP Entensions, by Vasseur et al.

U.S. Appl. No. 11/049,587, filed Feb. 2, 2005, entitled Inter-Domain Path Computation Technique, by Vasseur et al.

Rekhter, Y., RFC 1771, entitled A Border Gateway Protocol 4 (BGP-4), Mar. 1995, pp. 1-28.

Moy, J., RFC 2328, entitled OSPF Version 2, Apr. 1998, pp. 1-183.

Callon, R., RFC 1195, entitled Use of OSI ISIS for routing in TCP/IP and Dual Environments, Dec. 1990, pp. 1-80.

Perlman, Radia, Interconnections Second Edition: Bridges, Routers, Switches, and Internetworking Protocols, Section 12.2.4, Addison Wesley, 1999.

Vasseur, JP., et al., IETF Internet Draft entitled, Routing Extensions for Discovery of Multiprotocol (MPLS) Label Switch Router (LSR) Traffic Engineering (TE) Mesh Membership (draft-vasseur-ccamp-automesh-00.txt), CCAMP Working Group, Feb. 2005, pp. 1-10.

Vasseur, Jean-Philippe, et al., Internet Draft entitled, IS-IS Extensions for Advertising Router Information (draft-ietf-isis-caps-03.txt), May 2005, pp. 1-8.

Awduche, D., et al., RFC 3209, entitled RSVP-TE: Extensions to RSVP for LSP Tunnels, Dec. 2001, pp. 1-43.

Smit, H., et al., RFC 3784, entitled Intermediate System to Intermediate System (IS-IS) Extensions for Traffic Engineering (TE), Jun. 2004, pp. 1-13.

Katz, D. et al., RFC 3630, entitled Traffic Engineering (TE) Extensions to OSPF Version 2, Sep. 2003, pp. 1-14.

Braden, R. et al., RFC 2205, entitled Resource ReSerVation Protocol (RSVP), Version 1 Functional Specification, Sep. 1997, pp. 1-112.

Berger, L., RFC 3473, entitled Generalized Multi-Protocol Label Switching (GMPLS) Signaling Resource ReserVation Protocol-Traffic Engineering (RSVP-TE) Extensions, Jan. 2003, pp. 1-40.

Vasseur, J. P., et al., Network Working Group Internet Draft, entitled RSVP Path Computation Request and Reply Messages (draft-vasseur-mpls-computation-rsvp-05.txt), Jul. 2004, pp. 1-31.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Vasseur, JP. et al., Network Working Group Draft, entitled Path Computation Element (PCE) Communication Protocol (PCEP)—Version 1 (draft-vasseur-pce-pcep-01.txt), Jul. 2005, pp. 1-43.

Awduche, D., et al., RFC 3209, entitled RSVP-TE: Extensions to RSVP for LSP Tunnels, Dec. 2001, pp. 1-57.

* cited by examiner

L1L2 ROUTER CONTROLLED
DISTRIBUTION TABLE
600

| LEAK INFORMATION TYPE 612 | LEAKING STATE 614 | REQUESTING ROUTER IDs 616 |
|---|---|---|
| PREFIX-ORIG. ID 1 | ON | 1 |
| ⋮ | ⋮ | ⋮ |
| PREFIX-ORIG. ID N | OFF | [EMPTY] |
| ⋮ | ⋮ | ⋮ |
| PCE DISCOVERY | OFF | [EMPTY] |
| ⋮ | ⋮ | ⋮ |
| AUTOMESH - 1 | ON | 1, 3, 5 |
| ⋮ | ⋮ | ⋮ |
| AUTOMESH - N | OFF | [EMPTY] |
| ⋮ | ⋮ | ⋮ |

CONTROLLED DISTRIBUTION OF INTER-AREA ROUTING INFORMATION

RELATED APPLICATIONS

This application is related to U.S. patent application Ser. No. 11/001,459, entitled INTER-DOMAIN TE-LSP WITH IGP EXTENSIONS, and U.S. patent application Ser. No. 11/001,349, entitled PROPAGATION OF ROUTING INFORMATION IN RSVP-TE FOR INTER-DOMAIN TE-LSPS, both filed by Vasseur et al. on Dec. 1, 2004, the contents of both of which are hereby incorporated in their entirety.

BACKGROUND OF THE INVENTION

1. Field of the Invention

The present invention relates to computer networks and more particularly to retrieving reachability and other information across domains of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or, more particularly, an area or level is generally referred to as a "domain," and a router that interconnects different domains together is generally referred to as a "border router."

An example of an inter-domain routing protocol is the Border Gateway Protocol version 4 (BGP), which performs routing between domains (ASes) by exchanging routing and reachability information among neighboring inter-domain routers of the systems. An adjacency is a relationship formed between selected neighboring (peer) routers for the purpose of exchanging routing information messages and abstracting the network topology. The routing information exchanged by BGP peer routers typically includes Destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition,* by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Often, other routing and non-routing information may be contained within extensions to the IGP advertisements, such as, e.g., automesh group memberships. Briefly, a mesh group is a group of nodes that are connected in a mesh arrangement to each and every other node of the mesh group, and is described in detail in RFC 2973, entitled *IS-IS Mesh Groups*, dated October 2000. Automesh groups are mesh groups that are dynamically established by advertising node memberships to particular groups, and are described in further detail in Vasseur et al., *Routing Extensions for Discovery of Multiprotocol (MPLS) Label Switch Router (LSR) Traffic Engineering (TE) Mesh Membership <draft-vasseur-ccamp-automesh-00.txt>*, Internet Draft, February 2005, the contents of which are hereby incorporated by reference in their entirety.

Generally, IGP Advertisements are flooded across area/level boundaries throughout an AS, so that each IGP node of the AS has the same view of the network topology for the AS. There are various circumstances, however, where information in the extensions to the IGP Advertisements need not be advertised to every area/level of the AS. For example, assume that there are ten areas within a given network, but that only five of those areas require information regarding a particular automesh group membership. Currently, the flooding scope of the extensions may be controlled such that a particular extension is flooded or "leaked" throughout all areas/levels of the AS, or such that it remains within the originating area/level and does not leak past any border routers. Limiting the flooding scope of extensions is further described in Vasseur et al., *IS-IS Extensions for Advertising Router Information <draft-ietf-isis-caps-03.txt>*, Internet Draft, May 2005, the contents of which are hereby incorporated by reference in their entirety. According to this draft, however, the automesh group membership will be leaked to all areas, which is neither desirable nor optimal. Nodes within the areas are configured to ignore any undesired information, which causes excess traffic in the network. Manual configuration may be used to limit the extension's leaking to certain areas/levels, but it is cumbersome and prone to errors. There remains a need, therefore, for dynamic and granular control of extension leaking across area/level boundaries based on the needs/requirements of routers or nodes residing within each individual area/level.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will have sufficient knowledge to compute a path where the LSR or PCE may not have the required knowledge should the destination not reside in a directly attached domain. Because of this, MPLS Traffic Engineering path computation techniques are required to compute inter-domain TE-LSPs.

In order to extend MPLS TE-LSPs across domain boundaries, the use of PCEs may be configured as a distributed system, where multiple PCEs collaborate to compute an end-to-end path (also referred to as "Multi-PCE path computation"). Examples of such a distributed PCE architecture are described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, and U.S. patent application Ser. No. 11/049,587, entitled INTER-DOMAIN PATH COMPUTATION TECHNIQUE, filed by Vasseur et al., on Feb. 2, 2005, the contents of both which are hereby incorporated by reference in their entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes). Notably, those skilled in the art will understand that other methods may be used to compute inter-domain TE-LSPs, such as, e.g., loose hops, explicit paths, etc.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Occasionally, a head-end LSR or node will have multiple TE-LSPs into a particular domain (e.g., area or level) outside of its own domain (i.e., remote). These interdomain TE-LSPs may terminate at either a single tail-end LSR or node of the remote domain, or at different tail-end nodes within the same remote domain, depending upon their initial setup. A known limitation of such inter-domain TE-LSPs lies in the inability to automatically steer traffic onto such TE-LSPs when attempting to reach nodes or prefixes contained within the domain of the tail-end node. This limitation is primarily due to limited network topology information available to the head-end node. Currently, this lack of reachability information requires the use of static or policy-based routing which, in turn, generally requires manual configuration by a system administrator with prior knowledge of the network topology. Such alternatives can be cumbersome and limited in their applicability, and in some cases (e.g., misconfiguration) can be the cause of network failure. There remains a further need, therefore, for dynamically propagating reachability information of a tail-end node of a remote domain to a head-end node across domains.

SUMMARY OF THE INVENTION

The present invention is directed to a technique for controlling distribution of reachability information for a tail-end node of a traffic engineering (TE) label switched path (LSP) to a head-end node of the TE-LSP in a computer network. The TE-LSP preferably spans multiple domains of the network such that the tail-end node resides in a domain ("tail-end domain") that is different (remote) from the domain of the head-end node ("head-end domain"). According to the inter-domain information distribution technique, the head-end node requests the remote reachability information from the tail-end node, which may employ an Interior Gateway Protocol (IGP) to transmit the information to a border router of the tail-end domain. The tail-end domain border router then shares this information with at least a head-end domain border router. The head-end node thereafter requests that the head-end domain border router release the reachability information into the head-end domain. The head-end node uses the remote information to calculate routes, i.e., address prefixes and associated attributes, reachable from the tail-end node for insertion into its routing table.

In the illustrative embodiment described herein, the TE-LSP is established using Resource ReSerVation Protocol (RSVP) TE signaling messages. The head-end node inserts a reference (label) to the established TE-LSP into its routing table with an assigned metric as discovered by the RSVP TE signaling messages. The border node is illustratively embodied as an Intermediate-System-to-Intermediate-System (IS-IS) level 1/level 2 (L1L2) router and the IGP messages are illustratively embodied as IS-IS link state packets ("IGP advertisements"). Notably, the RSVP TE signaling messages and IGP advertisements include variable length fields, or type/length/value (TLV) encoded formats used to convey the remote reachability information.

In accordance with one aspect of the present invention, the head-end node requests the reachability information from the tail-end node using a request/response signaling exchange (e.g., RSVP). The request from the head-end node indicates whether the response should be through RSVP signaling or through IGP advertisements. If the request indicates RSVP, and the response length is within the message limitations of RSVP, then the tail-end node responds using RSVP accordingly. If, on the other hand, the request indicates IGP, or the response length is greater than RSVP allows, the tail end node sends an IGP advertisement with the requested reachability information within its domain to reach the tail-end domain border router (e.g., the L1L2 router). The tail-end node then notifies the head-end node (e.g., via RSVP) of compliance with the request.

In accordance with another aspect of the present invention, the tail-end domain border router receives the tail-end node response, and shares (propagates) this prefix reachability information among other border routers of the network (e.g., other L1L2 routers within the same level 2 network, or border routers within the same autonomous system, AS). Notably, the border router may also share other information, such as, e.g., PCE discovery or automesh information, in accordance with the present invention. Each border router maintains a controlled distribution table of whether to leak specific information into its level. The controlled distribution table may also contain a list of routers within the corresponding area (level 1) that are currently requesting particular information, wherein the border router only leaks the particular information when the list of requesting routers contains at least one router.

In accordance with still another aspect of the invention, to receive reachability information sent via IGP messages and stored at a border router, the head-end node sends a "leak request" (e.g., an IGP message) to the border router of the head-end domain requesting that the border router leak the reachability information received from the tail-end node into its area. The border router may be configured to respond by leaking the reachability information (e.g., via an IGP advertisement) pertaining to all tail-end nodes within the tail-end node domain, or just to the particular tail-end node within the leak request. Upon receiving the advertisement from the border router, the head-end node calculates routes using its local reachability information, as well as the remote reachability information from the tail-end node to create inter-domain reachability information. Prefixes that have been identified as "downstream" to a tail-end node are routed through the TE-LSP to that tail-end node. The head-end node assigns a metric to each address prefix obtained via the remote reachability information equal to the cost of the TE-LSP or, if available, equal to the corresponding originator cost value in addition to the TE-LSP cost.

Advantageously, the novel technique controls the distribution of reachability information for a tail-end node of a TE-LSP to a head-end node of the TE-LSP in a computer network. By propagating reachability information (and other information) to a domain in response to specific requests, the inventive technique limits excess distribution of unnecessary message traffic within the network. Also, by informing the head-end node of the reachability information for the tail-end node, the inventive technique provides an alternative to suboptimal routing techniques, such as cumbersome manual configuration (e.g., static routing or policy routing), that can avoid some of the risks and possible errors created in such sub-optimal routing techniques.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 6 is schematic block diagram of an exemplary controlled distribution table that may be advantageously used with the present invention;

DETAILED DESCRIPTION OF AN
ILLUSTRATIVE EMBODIMENT

Figure 1:
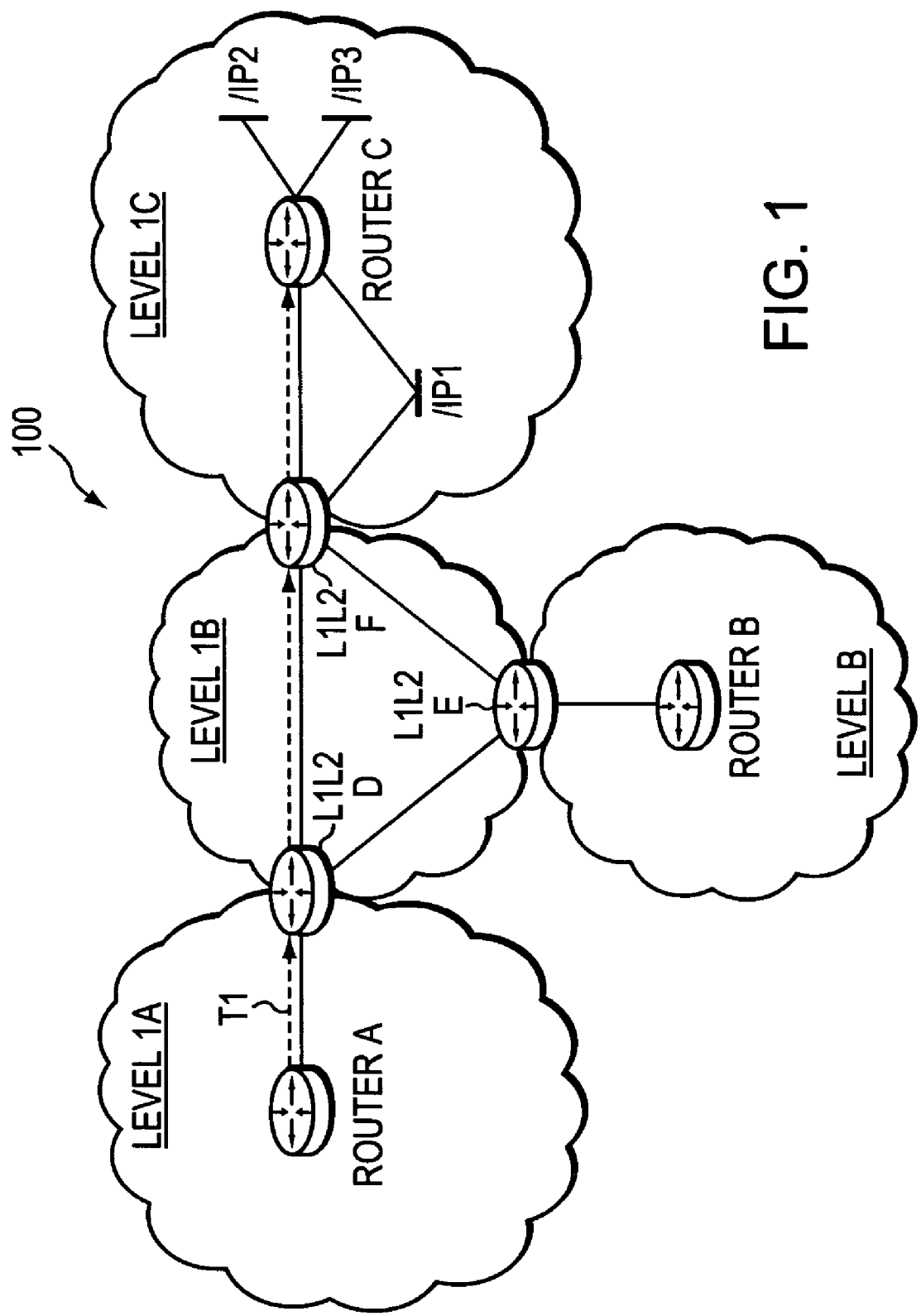
FIG. 1 is a schematic block diagram of an exemplary computer network of levels that may be used in accordance with the present invention.

FIG. 1 is a schematic block diagram of an exemplary computer network 100 comprising level 1 levels A, B, and C, interconnected by a backbone level 2 as shown. Illustratively, network 100 employs the Intermediate-System-to-Intermediate-System (IS-IS) routing protocol as its interior gateway protocol (IGP), known to those skilled in the art. Within network 100, levels 1A, 1B, and 1C have exemplary intradomain routers A, B, and C, respectively. Each level 1 level is connected to the level 2 backbone by a border router, or level 1/level 2(L1L2) router, such as L1L2 router D, E, and F, also respectively. In addition, shown within Level 1C are exemplary address prefixes IP1, IP2, and IP3, which are reachable from Level 1C as shown. Notably, the address prefixes need not be contained within Level 1C, as will be understood by those skilled in the art. As used herein, a level is a collection of routers that share full network topology information with each other but not necessarily with routers outside the level. A collection of levels may be contained within a single autonomous system (AS). The term level as used herein also encompasses the term "area" which has a similar meaning for networks that employ Open Shortest Path First (OSPF) as their IGP, in which case the L1L2 routers D, E, and F are embodied as area border routers, and level 2 is embodied as a backbone area. The terms level and area are used interchangeably herein, as well as the use of L1L2 routers and area border routers. Notably, any number of nodes or routers may be used in the network 100, and that any number of links may be contained within the network 100 interconnected in various other configurations. These examples are merely representative, and the view shown herein is for simplicity.

Data packets may be exchanged among the levels 1A, 1B, and 1C using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the areas using predetermined IGPs, such as conventional distance-vector protocols or, illustratively, link-state protocols (e.g., IS-IS), through the use of link-state advertisements or link-state packets ("IGP Advertisements").

Figure 2:
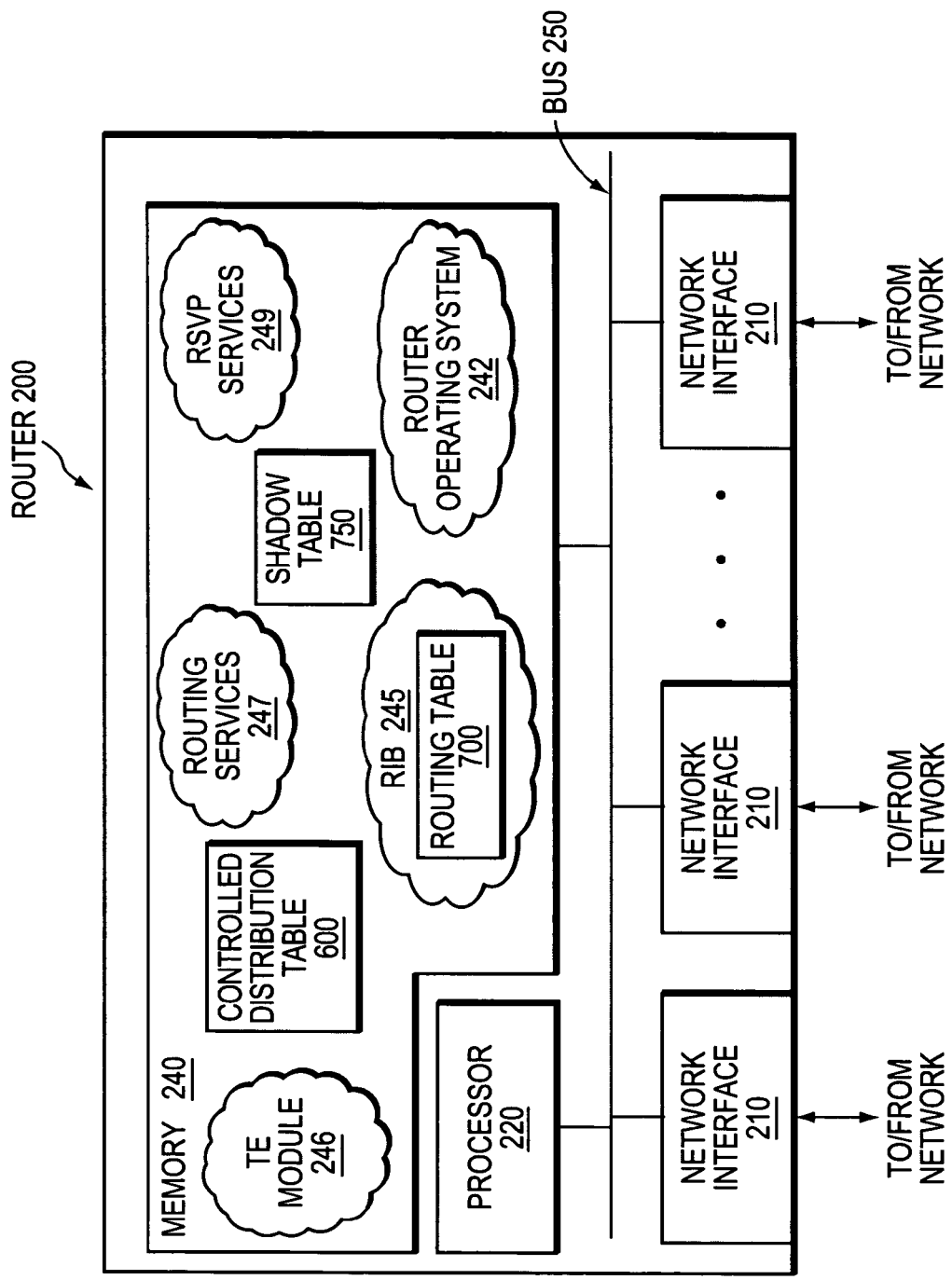
FIG. 2 is schematic block diagram of an exemplary router that may be advantageously used with the present invention.

FIG. 2 is a schematic block diagram of an exemplary router 200 that may be advantageously used with the present invention, e.g., as an intradomain router or a border router (L1L2 router). The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 700 and shadow table 750, or controlled distribution table 600 in an L1L2 router. A router operating system 242, portions of which are typically resident in memory 240 and executed by the processor, functionally organizes the router by, inter alia, invoking network operations in support of software processes and/or services executing on the router. These software processes and/or services include Routing Information Base (RIB) 245, Traffic Engineering (TE) module 246, routing services 247, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g. IS-IS and OSPF. These functions may be configured to manage a forwarding information database (not shown) containing, e.g., data used to make forwarding decisions. Also, RIB 245 may operate in conjunction with routing services 247 to maintain and manage routing tables 700 as will be understood by those skilled in the art. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE module (services) 246 contains computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE Database (TED) (not shown) may be used to store TE information provided by the routing protocols, such as IGP and/or RSVP, and is illustratively maintained and managed by TE services 246.

Changes in the network topology may be communicated among routers 200 using a link-state protocol, such as the conventional IS-IS and OSPF protocols. Suppose, for example, that a communication link fails within an AS or a cost value associated with a network node changes. Once the change in the network's state is detected by one of the routers, that router may flood an IGP Advertisement communicating the change to the other routers in the AS. In this manner, each of the routers eventually "converges" to an identical view of the network topology.

Figure 3:
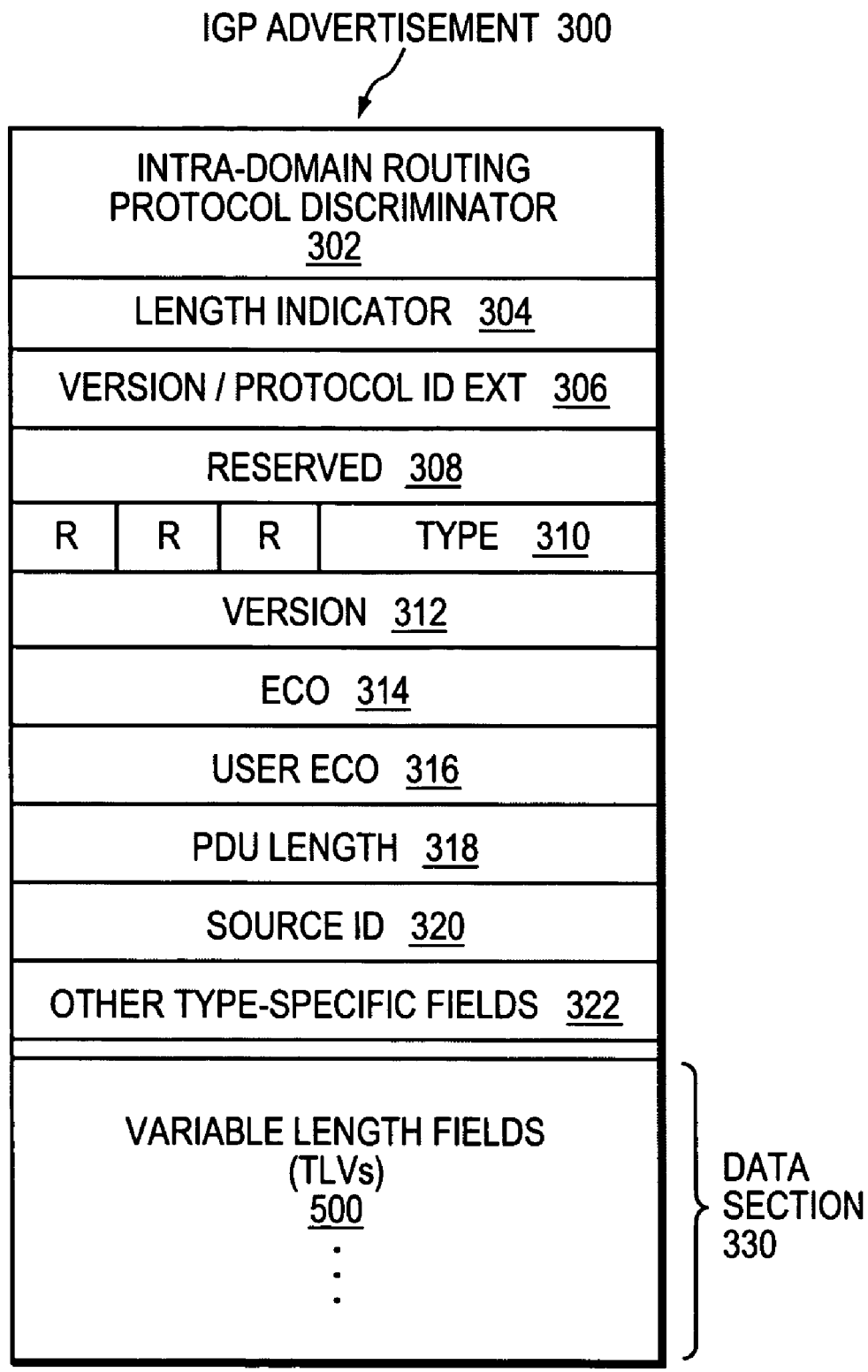
FIG. 3 is a schematic block diagram of an exemplary IGP Advertisement that may be flooded by the routers.

FIG. 3 illustrates an exemplary IGP Advertisement 300 that may be flooded by the routers 200, (e.g., an IS-IS Link State Packet). The packet includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are ignored by the receiving router until directed for decoding in future versions of the protocol.

A type field 310 (and corresponding version field 312) stores a value indicating the type (and version) of IGP Advertisement 300 being transmitted, which may define what other type-specific fields 322 may be located within the advertisement. For example, the type of advertisement may be a "Hello" packet, or an "LSP" packet, as will be understood by those skilled in the art. The PDU length field 318 stores a value indicating the length of the entire PDU (Protocol Data Unit, or IGP Advertisement 300), including the header, type-specific fields, and data fields. A source ID field 320 stores a value that identifies the router that generated and originally broadcast the IGP Advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the IGP Advertisement. Typically, the sequence number stored in the field is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number. A remaining lifetime field (not shown) may also be used to store a value that may be used for determining whether the IGP Advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the IGP Advertisement has become invalid. That is, every router 200 that stores or floods the IGP Advertisement 300 continuously ages the packet until the remaining lifetime value equals zero. Those skilled in the art will appreciate that other aging mechanisms alternatively may be used, such as incrementing the IGP Advertisement remaining lifetime value from an initial value, e.g., equal to zero, until the remaining lifetime value reaches a known upper limit.

The data section 330 includes one or more variable length fields 500, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node stored in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 500 of the IGP Advertisement 300, such as checksum values, padding fields, proprietary fields, etc., and/or reachability information fields, such as a novel inter-domain reachability field (described further below). Generally, the received IGP Advertisements are stored in a Link-State Database (LSDB) of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. An example TE-LSP (T1) may be seen in FIG. 1 as the dashed lines and arrows between routers A and C. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al. *RSVP Path Computation Request and Reply Messages <draft-vasseur-mpls-computation-rsvp-05.txt>*, Internet Draft, July 2004, or in Vasseur, et al., *Path Computation Element (PCE) communication Protocol (PCEP)—Version 1<draft-vasseur-pce-pcep-01.txt>*, Internet Draft, July 2005, which are hereby incorporated by reference as though fully set forth herein. It should be understood that the use of RSVP or PCEP serves only as an example, and that other communication protocols may be used in accordance with the present invention.

Figure 4A:
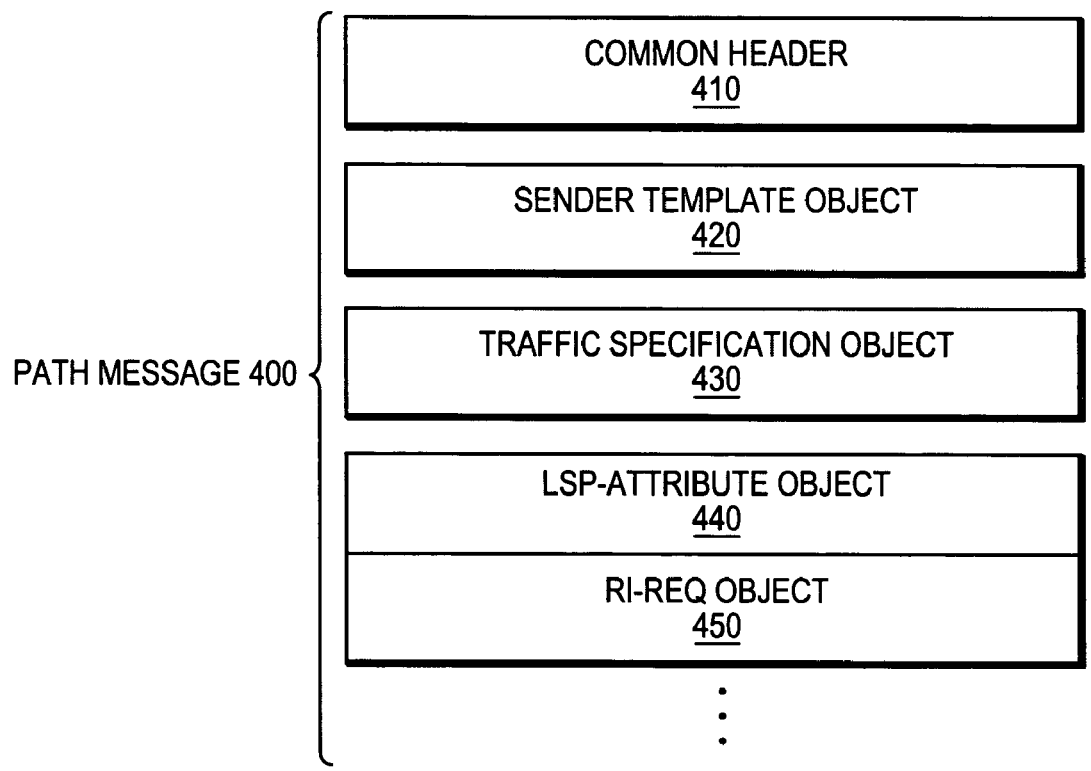
FIG. 4A is a schematic block diagram of portions of an RSVP Path message that may be advantageously used with the present invention.

In accordance with RSVP, to establish a TE-LSP (data flow) between a sender (e.g., head-end node Router A) and a receiver (e.g., tail-end node Router C), the sender may send an RSVP path (Path) message downstream hop-by-hop along a path (e.g., a unicast route) to the receiver to identify the sender and indicate e.g., bandwidth needed to accommodate the data flow, along with other attributes of the TE-LSP. The Path message may contain various information about the data flow including, e.g., traffic characteristics of the data flow. FIG. 4A is a schematic block diagram of portions of an RSVP Path message 400 that may be advantageously used with the present invention. Message 400 contains, inter alia, a common header 410, a sender template object 420, a traffic specification (Tspec) object 430 and an LSP-Attribute object 440. It should be noted that Path message 400 may contain other objects including a Routing Information Request (RI-REQ) object 450 (described further below).

Figure 4B:
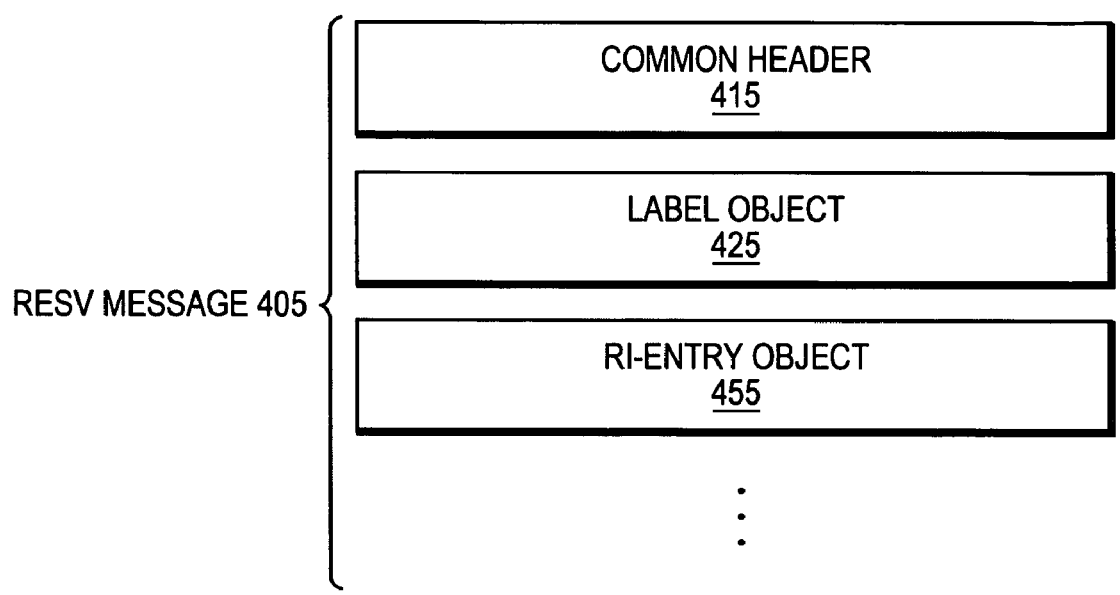
FIG. 4B is a schematic block diagram of portions of an RSVP Resv message that may be advantageously used with the present invention.

To establish a TE-LSP (data flow) between a receiver and a sender, the receiver may return an RSVP Reserve (Resv) message upstream along the path to the sender to confirm the attributes of the TE-LSP, and provide a TE-LSP label. FIG. 4B is a schematic block diagram of portions of an RSVP Resv message 405 that may be advantageously used with the present invention. Message 405 contains, inter alia, a common header 415 and a label object 425. It should be noted that message 405 may contain other objects including a Routing Information Entry (RI-ENTRY) object 455 (described further below). It should be further noted that in accordance with RSVP signaling, the state of the RSVP is refreshed on a timed interval, e.g., every thirty seconds, in which RSVP Path and Resv messages are exchanged. This timed interval is configurable by a system administrator.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present invention is directed to a technique for controlling distribution of reachability information for a tail-end node of a TE-LSP to a head-end node of the TE-LSP in a computer network. The TE-LSP preferably spans multiple domains of the network such that the tail-end node resides in a domain ("tail-end domain") that is different (remote) from the domain of the head-end node ("head-end domain"). According to the inter-domain information distribution technique, the head-end node requests the remote reachability information from the tail-end node, which may employ an IGP to transmit the information to a border router of the tail-end domain. The tail-end domain border router then shares this information with at least a head-end domain border router. The head-end node thereafter requests that the head-end domain border router release the reachability information into the head-end domain. The head-end node uses the remote information to calculate routes, i.e., address prefixes and associated attributes, reachable from the tail-end node for insertion into its routing table.

In the illustrative embodiment described herein, the TE-LSP is established using RSVP TE signaling messages. In particular, RSVP services 249 employs such signaling and techniques to compute one or more metrics (e.g., costs) associated with the established TE-LSP. A reference (label) to the TE-LSP, as well as the computed metric, are then stored in shadow table 750, as described herein. The head-end node thereafter inserts the TE-LSP reference into its routing table 700 with an assigned metric as discovered by the RSVP TE signaling messages. The tail-end node and a border node propagate ("advertise") the remote reachability information related to the tail-end node of the TE-LSP by means of IGP messages transmitted across domains, e.g., IGP areas/levels. The border node is illustratively embodied as an IS-IS level 1/level 2 (L1L2) router and the IGP messages are illustratively embodied as IS-IS link state packets ("IGP advertisements"). Notably, the RSVP TE signaling messages and IGP advertisements include variable length fields, or type/length/value (TLV) encoded formats used to convey the remote reachability information.

The TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 5:
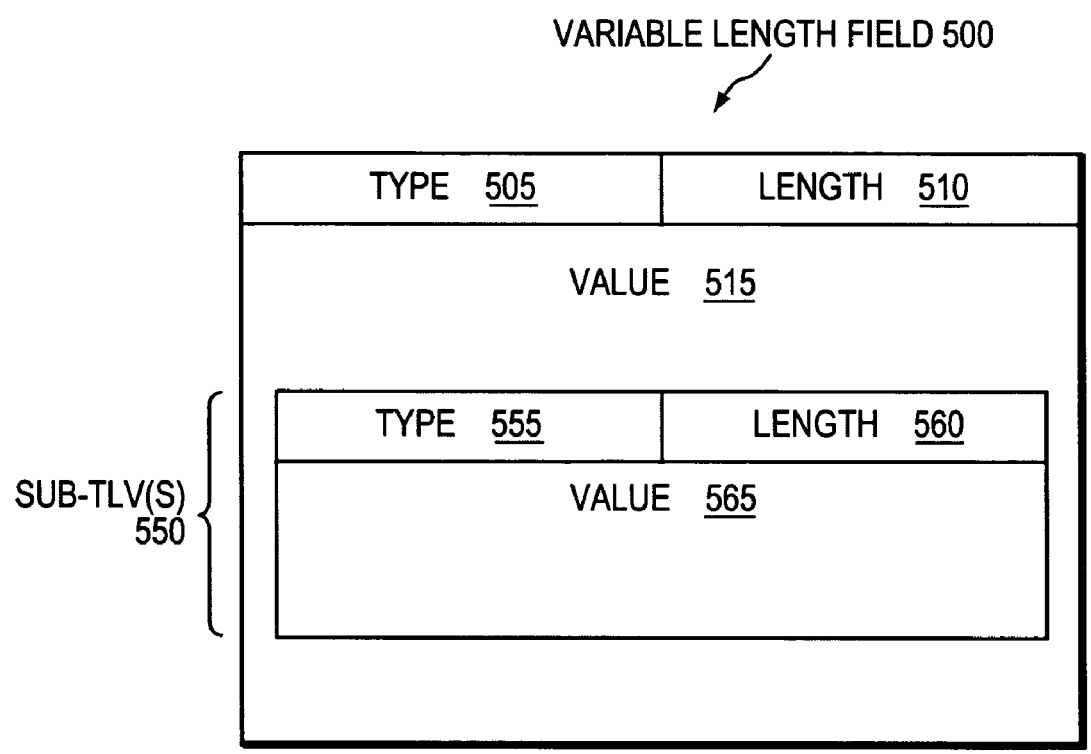
FIG. 5 is a schematic block diagram illustrating the format of Variable Length Field (TLV) that may be advantageously used with the present invention.

FIG. 5 is a schematic block diagram illustrating the format of a variable length field (TLV) 500 that may be advantageously used with the present invention. The variable length field 500 is illustratively embodied as a TLV contained in an IGP advertisement 300 and is extended to carry an address prefix reachable from a particular tail-end node. To that end, the "extended reachability TLV" 500 is organized to include a Type field 505 containing a predetermined type value (e.g., a "type 135" or "extended IP reachability" TLV), as defined in above-referenced RFC 3784. The Length field 510 is a variable length value. The TLV encoded format may also comprise one or more non-ordered sub-TLVs 550 carried within the TLV "payload" (e.g. Value field 515), each having a Type field 555, Length field 560, and Value field 565. The fields of the TLV 500 and sub-TLV(s) 550 are used in a variety of manners, including as described herein, according to the present invention.

In accordance with one aspect of the present invention, the head-end node (e.g., router A) requests the reachability information from the tail-end node (e.g., router C) using a request/response signaling exchange (e.g., RSVP). For example, in RSVP the head-end node requests the reachability information from the tail-end node by setting a flag (not shown) in the Path message 400 to be read by the tail-end node, such as during the set up of the TE-LSP. The flag may be contained within the RI-REQ object 450, which may be embodied as a TLV 500. Those skilled in the art will understand that other request signaling protocols may be used, and that RSVP serves only as an example. The request from the head-end node indicates whether the response should be through RSVP signaling or through IGP advertisements, such as by the setting of one or more flags within the Path message 400. Notably, the border router (e.g., the L1L2 router L1L2 D) may not be configured to support IGP propagation of the reachability information, in which case the border router may notify the head-end node of its inability to comply with the requests.

The reachability information request may include a prefix list filter (access control list, ACL) indicating prefix(es) in which the head-end node is interested, as will be understood by those skilled in the art. The prefix list filter may be carried as an additional TLV 500, or within a sub-TLV 550, such as in the RI-REQ object 450. Upon receiving the request, the tail-end node examines the prefix list filter to determine whether the total amount of requested prefixes will require a greater length than conventional RSVP messages allow. In the event the request indicates RSVP, and the response length is within the message limitations of RSVP, then the tail-end node responds using RSVP accordingly. The use of RSVP (Path messages 400, Resv messages 405, and TLVs 500) to transmit the requested reachability information is described in detail in above-referenced U.S. patent application Ser. No. 11/001,349, entitled PROPAGATION OF ROUTING INFORMATION IN RSVP-TE FOR INTER-DOMAIN TE-LSPS.

If, on the other hand, the request indicates IGP, or the response length is greater than RSVP allows, the tail end node sends an IGP advertisement with the requested reachability information within its domain to reach the tail-end domain border router (e.g., the L1L2 router). As mentioned above, the tail-end node checks for a prefix list filter and extracts all matching prefixes from its routing table. The corresponding prefixes are inserted into an IGP advertisement 300 to be propagated across the level to the border router. If no prefix list filter (or ACL) is present in the request from the head-end node, the tail-end node returns a list of all reachable address prefixes. In order to prevent other IGP nodes from considering these address prefixes in their route calculations, the address prefixes may be inserted into an inter-domain reachability field (e.g., a novel "InterArea-TE-Prefix TLV") within the IGP advertisement 300, such as in variable length field 500. Notably, the tail-end node may be configured to only return "downstream" prefixes, from the head-end node's perspective. As an example, as those skilled in the art will understand, according to the head-end node (router A), of the address prefixes within the tail-end domain (Level 1C) address prefixes IP 2 and IP 3 are downstream from to the tail-end node (router C), while IP 1 is not (i.e., it is upstream from router C). Upon transmitting the inter-domain reachability field, the tail-end node then notifies the head-end node (e.g., via RSVP) of compliance with the request.

In accordance with another aspect of the present invention, the tail-end domain border router (e.g., L1L2 F) receives the tail-end node response, and shares (propagates) this prefix reachability information among other border routers of the network (e.g., other L1L2 routers, D and E, within the same level 2 network, or border routers within the same autonomous system, AS). This information may be propagated within the same forwarded IGP Advertisement 300 as received from the tail-end node, or within a new IGP Advertisement, as will be understood by those skilled in the art. Notably, the border router may also share other information, such as, e.g., PCE discovery or automesh information, in accordance with the present invention. This information, particularly, "controlled distribution information," may be stored within memory 240 of the border routers to be leaked into the areas when requested, as described herein.

Each border router maintains a controlled distribution table of whether to leak specific information into its level, i.e., the controlled distribution information. FIG. 6 is schematic block diagram of exemplary controlled distribution table 600 that may be advantageously used with the present invention. Controlled distribution table 600 is illustratively stored in memory 240 of an L1L2 Router (e.g., L1L2 D) and includes one or more entries 610, each comprising a plurality of fields for storing a Leak Information Type 612, a Leaking State 614, and a Requesting Router ID 616. The controlled distribution table 600 is illustratively maintained and managed by routing services 247. Notably, a separate table may be maintained for each area or level.

Leak Information Type field 612 contains the specific type of controlled distribution information that may be leaked. For example, prefix reachability information from different tail-end nodes may each have their own type, differentiated by the tail-end node's origin identification (ID), as well as PCE Discovery requests and specific automesh groups. The Leaking State field 614 designates whether the information corresponding to the specific type should be leaked into the area. The leaking state may be configured as a flag, one or more bits, a specific value, or other means known to those skilled in the art. Illustratively, Leaking State field 614 contains either and ON or OFF status. The controlled distribution table 600 may also contain a list of routers within the corresponding area (level 1) that are currently requesting particular information in Requesting Router IDs field 616. The border router may be configured such that it only leaks the controlled distribution information when the list of requesting routers contains at least one router. As such, when a router within the corresponding area originates a request to receive specific leaked information, the leaking state 614 is set to ON, and the ID of requesting router is stored in Requesting Router IDs field 616. If the list of requesting routers is empty for a particular type, the leaking state is set to OFF. It should be noted that the default value for the leaking state 614 may be configured as OFF to prevent unnecessary leaking into an area. Moreover, those skilled in the art will appreciate that the use of the controlled distribution may reduce the overall size of IGP Advertisements 300 (e.g., link state packets), which may reduce the occurrence of fragmentation of the Advertisements.

In accordance with still another aspect of the invention, to receive reachability information sent via IGP messages and stored at a border router, the head-end node (router A) sends a "leak request" (e.g., an IGP message 300) to the border router of the head-end domain (e.g., L1L2 D) requesting that the border router leak the reachability information received from the tail-end node into its area (e.g., Level 1A). For example, a new sub-TLV 550 (e.g., a "tail-end-routes-request" sub-TLV) may be carried within a known router capability TLV 500 sent from the router containing a tail-end node ID (or tail-end domain ID), in order to inform the border routers of an interest in receiving the tail-end node's reachability information. Those skilled in the art will understand that other communication methods between the intra-domain routers and border routers may be used, and the use of the router capability TLV is merely an example. Notably, while the routers may be configured to statically request the information as they desire it, they may also be optimized such that a router only requests that information be leaked into its area if no other router within that area is currently requesting the same information. In this situation, once the current requests from another router stop, the router must request that the information still be leaked. This optimized configuration, while potentially utilizing more processing resources, minimizes traffic flow throughout the area.

The border router may be configured to respond (to the request) by leaking the reachability information (e.g., via an IGP advertisement 300) pertaining to all tail-end nodes within the tail-end node domain, or just to the particular tail-end node within the leak request. In either configuration, the border router receives the request containing a tail-end node ID or tail-end domain ID, and matches that ID to an origin ID of stored information and/or leak information type (e.g., field 612 of FIG. 6). On the other hand, the request may also contain a PCE Discovery request, or a specific automesh group ID, or any combination thereof. As described with reference to the controlled distribution table 600 above, the leak state is set (e.g., to ON) for that particular leak information type so that the border router leaks the requested information into the area from which the request originated (e.g., Level 1A). Notably, when leaking reachable address prefixes, certain prefixes that may not have been allowed to be leaked into a particular area (level 1) based on leaking rules within the network may be leaked based upon the request according to the present invention.

To leak the information, the border router may use a conventional IGP Advertisement 300 with an additional variable length field 500 for the requested information (e.g., a "leak-info" TLV). For reachability information, the leak-info TLV may contain an originator ID value indicating a particular tail-end node or domain from which each address prefix is reachable, as well as an originator cost value indicating the cost to reach the prefix from that tail-end node, as learned from the tail-end node response advertisement propagated throughout the backbone area described above. Notably, the originator ID and cost may simply be added to conventional prefix advertisements (e.g., IS-IS TLV-135) if the prefix is already being advertised. This situation may occur when the reachable prefixes are a subset of existing routing table prefixes, and this optional optimization avoids the need to replicate prefixes. To leak PCE Discovery and automesh group information into the area, the border router may use conventional advertisements known to those skilled in the art, but if used in accordance with the present invention, only upon an explicit request from one or more routers within that area.

Upon receiving the advertisement 300 from the border router for reachability information, the head-end node calculates routes using its local reachability information, as well as the remote reachability information from the tail-end node to create inter-domain reachability information. Prefixes that have been identified as "downstream" to a tail-end node are routed through the TE-LSP to that tail-end node. The head-end node assigns a metric to each address prefix obtained via the remote reachability information equal to the cost of the TE-LSP or, if available, equal to the corresponding originator cost value in addition to the TE-LSP cost. More specifically, the head-end node loads the remote reachability information into the shadow table 750 prior to inserting that resulting information into its routing table 700.

Figure 7:
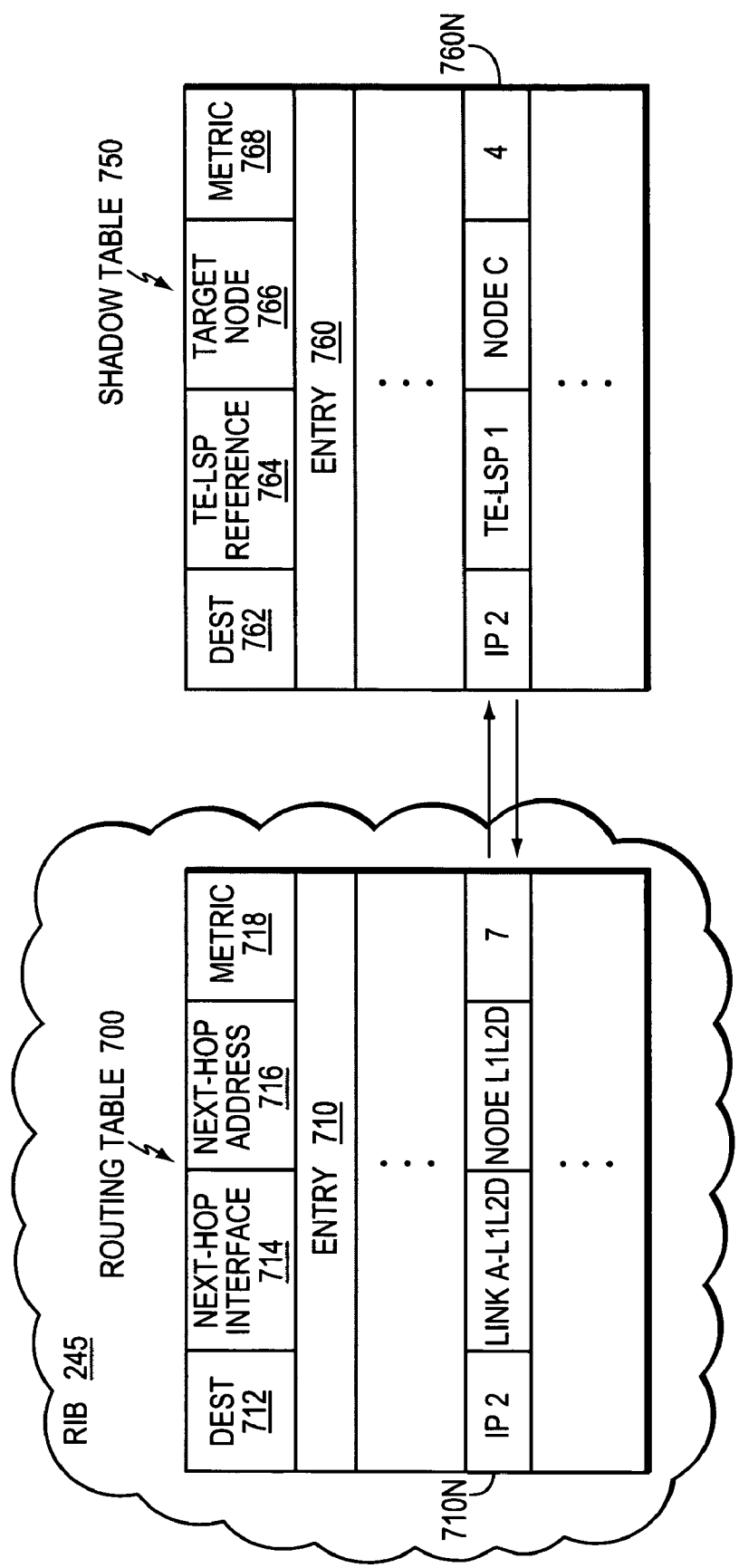
FIG. 7 is schematic block diagram of an exemplary routing table that may be advantageously used with the present invention.

FIG. 7 is schematic block diagram of exemplary routing table 700 that may be advantageously used with the present invention. Routing table 700 is illustratively stored in memory 240 and includes one or more entries 710, each comprising a plurality of fields for storing a reachable destination address 712, a next-hop interface 714 and next-hop address 716 to reach that destination, and an associated metric (e.g., cost) 718 of reaching the destination. The routing table 700 is illustratively maintained and managed by RIB 245. To that end, the RIB 245 maintains copies of routes (paths) provided by the routing protocols, such as IGP, in order to compute best paths/routes for installation into the routing table 700.

For example, assume that a destination address prefix IP2 is reachable from node A via node C. In addition, the cost of the path A-C connecting node A to node C is "6" (such as via L1L2 D, L1L2 E, and L1L2 F of FIG. 1), and the cost of the link to the reachable address IP2 is "1." A destination address field 712 of entry 710N contains the reachable address IP2, and the next-hop fields 714, 716, are populated with, e.g., link A-L1L2 D and a loopback address of node L1L2 D, respectively. Note that a loopback address of the next hop node is used as the next-hop address for many reasons, including as a way to avoid depending upon the availability of network interfaces of that node. The cost of IP2 is the cost of all links to the reachable address, i.e., "7."

Associated with IP2 of entry 710N is a shadow table 750. As noted, the shadow table 750 is initially created by RSVP services 249, using the TE-LSP information obtained from RSVP signaling messages. However, according to the invention, (IGP) routing services 247 (and, illustratively IS-IS) cooperates with RSVP services 249 to populate certain fields of the shadow table 750 with the remote reachability information obtained from the target node. The shadow table 750 essentially comprises the same format as routing table 700, but with destination address prefixes reachable via the target node of the TE-LSP. Specifically, each entry 760 of the shadow table 750 may include a plurality of fields for storing a destination prefix 762 reachable from the target node, a reference to the TE-LSP 764 of the target node, the address of the target node 766, and a cost metric 768 from the head-end node to the reachable prefix. As mentioned above, the shadow table 750 may store a metric 768 equal to the TE-LSP (TE-LSP 1), or equal to the corresponding originator cost value (mentioned above) in addition to the TE-LSP cost. Illustratively, cost metric 768 is the cost of a TE-LSP between nodes A and C, e.g., "4." Notably, the cost metric for the TE-LSP may be greater than, less than, or equal to the cost of the IP routing links, and that the values "4" and "7" respectively should be taken as examples.

According to the invention, the IGP/RSVP services cooperate with the RIB 245 to merge the contents of a shadow table entry 760N with a respective routing table entry 710N when the reachable destination addresses match. In order for the routing table insertion to work properly, it is required that the head-end node apply a timer before updating its routing table in order for the remote reachability information (prefix) to be loaded into the shadow table 750. As a result of the merge, the associated attributes of the routing table entry 710N are updated to reflect attributes reachable by the target node. For example, the entry 710N of the routing table 700 is updated such that the next-hop interface field 714 contains the TE-LSP reference from entry 764, the next-hop address field 716 contains node C from field 766, and the metric field 718 contains the cost of the TE-LSP (e.g., the value "4") from field 768.

The updated routing table 700 thus contains prefixes reachable from the TE-LSP, such that traffic may be routed to those prefixes along the TE-LSP. Notably, the head-end node dynamically calculates these routes, such as when updated routing information is received, as described above. Also, in one aspect of the present invention, the updated routing information triggers a partial route calculation (PRC) (such as in the case of ISIS) and not a full SPF.

In the event the TE-LSP becomes unavailable (e.g., manually removed or a TE-LSP failure), the merged prefixes and associated attributes from the shadow table 750 are removed from the routing table 700. In one aspect of the present invention, the prefixes are removed after the TE-LSP has not been restored before the expiration of a predetermined timer. Also, in another aspect of the present invention, a wait-to-restore (WTR) timer may be advantageously used before re-associating prefixes to a restored TE-LSP, in order to avoid multiple traffic disruptions in case of resource flapping. Notably, the merging of shadow table 750 and routing table 700 is further described in above-incorporated U.S. application Ser. Nos. 11/001,459 and 11/001,349.

Figure 8:
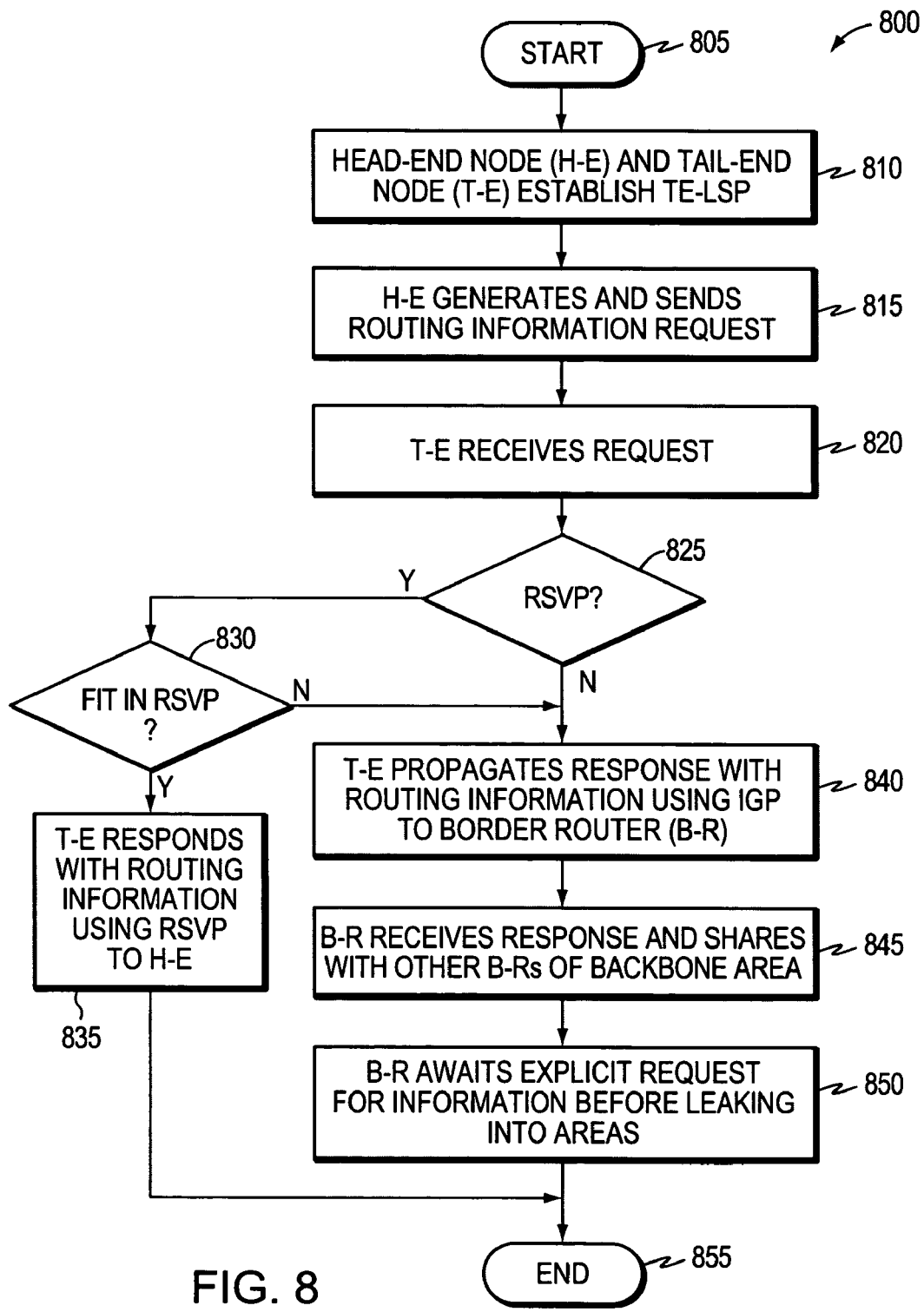
FIG. 8 is a flowchart illustrating a sequence of steps for propagating reachability information in accordance with the present invention.

FIG. 8 is a flowchart illustrating a sequence of steps for propagating reachability information in accordance with the present invention. The sequence 800 starts at step 805, and continues to step 810, where a head-end node (e.g., router A) and tail-end node (e.g., router C) establish a TE-LSP (e.g., Ti), as will be understood by those skilled in the art. Once the TE-LSP is established, the head-end node generates and sends a reachability (routing) information request in step 815, such as, e.g., through RSVP TE signaling messages sent along the TE-LSP. In step 820, the tail-end node receives the request. If in step 825 the request indicates RSVP as the preferred notification method, the tail-end node determines whether the response (e.g., based on the size of the prefixes to be returned, such as within an ACL) would fit within the message length limit of a conventional RSVP message in step 830. If the response will fit, the tail-end node responds with the routing information using RSVP, e.g., as described above, in step 835, and the sequence ends at step 855.

If the request does not indicate RSVP (e.g., IGP) in step 825, or if in step 830 an RSVP response would be too large, the tail-end node propagates a response with the routing information using an IGP message (e.g., IGP Advertisement 300, as described above) to the border router (e.g., L1L2 F) in step 840. Upon receiving the response, the border router shares the information with other border routers of the backbone area (e.g., Level 2) in step 845. In step 850, the border router awaits an explicit request for the information, as described herein, before leaking the information into any areas. The sequence ends at step 855.

Figure 9:
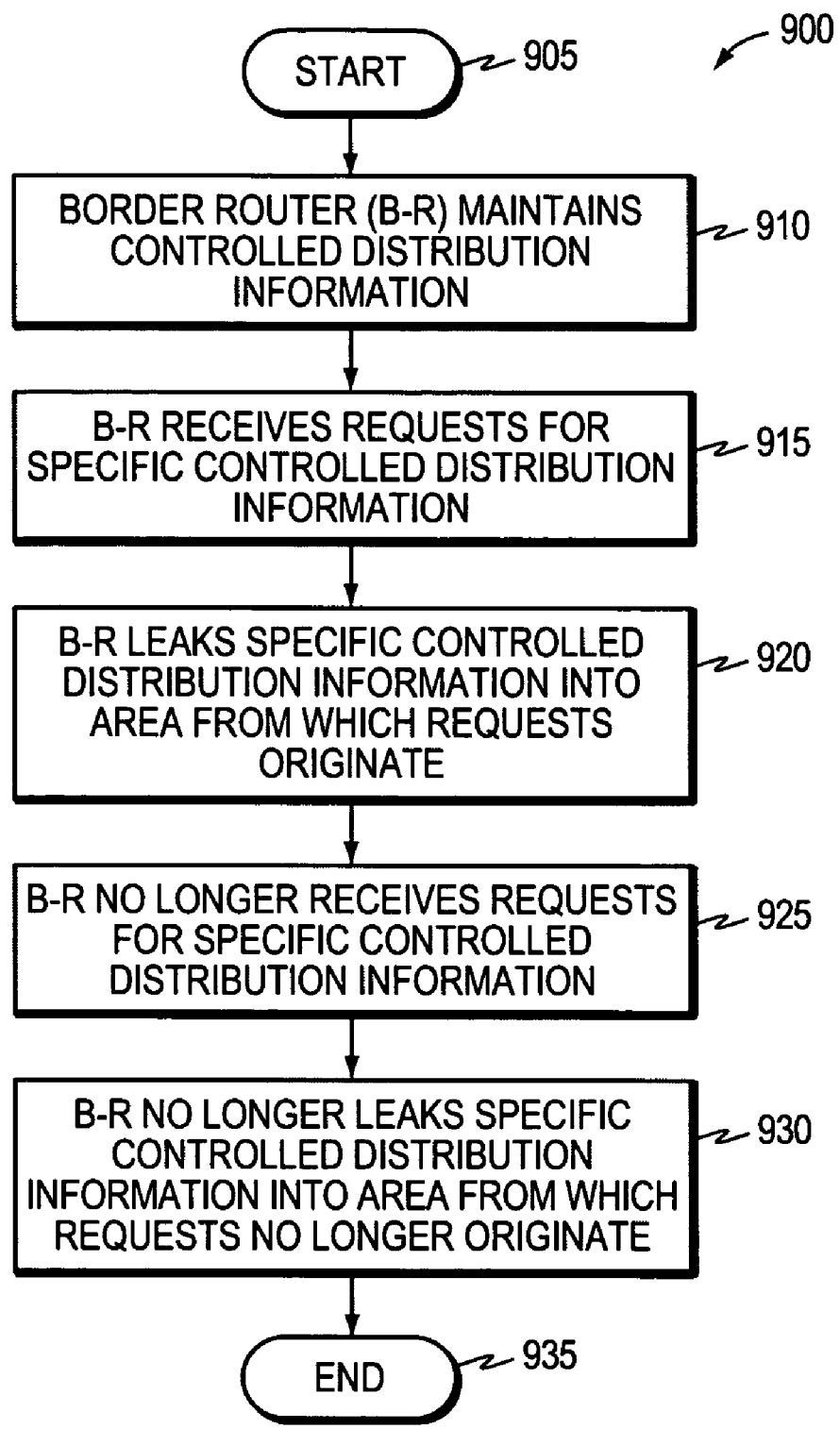
FIG. 9 is a flowchart illustrating a sequence of steps for requesting and leaking controlled distribution information in accordance with the present invention.

FIG. 9 is a flowchart illustrating a sequence of steps for requesting and leaking controlled distribution information in accordance with the present invention. The sequence 900 starts at step 905, and continues to step 910, where a border router (e.g., L1L2 D, as mentioned above) maintains controlled distribution information, such as in table 600. The controlled distribution information may be the reachability information obtained in accordance with FIG. 8 above, or other information (e.g., PCE Discovery, automesh groups, etc.) as described herein. Upon receiving a request for specific controlled distribution information in step 915, e.g., from an intra-domain router (router A), the border router leaks the specific controlled distribution information into the area from which the request originates (e.g., Level 1A) in step 920. As mentioned above, the border router leaks the information into an area so long as at least one request for the information is received from that area. Once the border router no longer receives requests for specific controlled distribution information from a particular area in step 925, the border router no longer leaks the specific controlled distribution information into the area from which the requests no longer originate in step 930. The sequence then ends at step 935.

Advantageously, the novel technique controls the distribution of reachability information for a tail-end node of a TE-LSP to a head-end node of the TE-LSP in a computer network. By propagating reachability information (and other information) to a domain in response to specific requests, the inventive technique limits excess distribution of unnecessary message traffic within the network. Also, by informing the head-end node of the reachability information for the tail-end node, the inventive technique provides an alternative to sub-optimal routing techniques, such as cumbersome manual configuration (e.g., static routing or policy routing), that can avoid some of the risks and possible errors created in such sub-optimal routing techniques.

While there has been shown and described an illustrative embodiment that controls the distribution of reachability information for a tail-end node of a TE-LSP to a head-end node of the TE-LSP in a computer network, it is to be understood that various other adaptations and modifications may be made within the spirit and scope of the present invention. For example, the invention has been shown and described herein using IS-IS IS IGP Advertisements. However, the invention in its broader sense is not so limited, and may, in fact, be used with OSPF or other IGP Advertisements not discussed herein.

Moreover, while the above description describes performing the technique at the head-end node of the TE-LSP, the invention may also be advantageously used with PCEs computing the paths for the TE-LSPs. In addition, while the invention has been shown and described using RSVP TE messages to transmit requests and responses, those skilled in the art will understand that other request/response communication protocols may be used. Also, as described further in above-incorporated U.S. application Ser. No. 11/001,459, an IGP node other than the tail-end node, such as a border router within the tail-end domain, may be used to calculate and propagate the desired reachability information.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for controlling distribution of reachability information for a tail-end node of a traffic engineering (TE) label switched path (LSP) to a head-end node of the TE-LSP in a computer network, the TE-LSP spanning multiple domains of the network such that the tail-end node resides in a domain that is remote from the local domain of the head-end node, the method comprising:
   requesting, from the head-end node, reachability information from the tail-end node;
   transmitting, from the tail-end node, the reachability information via an Interior Gateway Protocol (IGP) advertisement to a border router of the remote domain (remote border router);
   propagating the reachability information with one or more other border routers, at least one of the one or more other border routers being a border router in the local domain (local border router); and
   requesting, from the head-end node, that the local border router release the reachability information into the local domain.

2. The method as in claim 1, further comprising:
   leaking the reachability information from the local border router into the local domain in response to the request from the head-end node to release the reachability information.

3. The method as in claim 1, further comprising:
   calculating, at the head-end node, routes reachable via the tail-end node through the TE-LSP; and
   inserting the routes into a routing table of the head-end node.

4. The method as in claim 1, further comprising:
   indicating within the request for reachability information from the tail-end node that the tail-end node should respond using IGP advertisements.

5. The method as in claim 1, further comprising:
   transmitting, from the tail-end node, the reachability information via the IGP advertisement in response to an indication within the request that the tail-end node should respond using a Resource ReSerVation Protocol (RSVP) message, in the event the reachability information is too large to fit within the RSVP message.

6. A system for controlling distribution of reachability information for a tail-end node of a traffic engineering (TE) label switched path (LSP) to a head-end node of the TE-LSP in a computer network, the TE-LSP spanning multiple domains of the network such that the tail-end node resides in a domain that is remote from the local domain of the head-end node, the system comprising:
   a reachability information request to send from the head-end node to the tail-end node;
   an Interior Gateway Protocol (IGP) advertisement to transmit, from the tail-end node, the reachability information;
   a border router of the remote domain (remote border router) to receive the IGP advertisement;
   one or more other border routers to which the remote border router propagates the reachability information, at least one of the one or more other border routers being a border router in the local domain (local border router); and
   a release request to be sent from the head-end node to the local border router to request that the local border router release the reachability information into the local domain.

7. The system as in claim 6, further comprising:
   a controlled distribution table at the local border router, the controlled distribution table indicating whether to distribute the reachability information into the local domain.

8. An apparatus for controlling distribution of reachability information for a tail-end node of a traffic engineering (TE) label switched path (LSP) to a head-end node of the TE-LSP in a computer network, the TE-LSP spanning multiple domains of the network such that the tail-end node resides in a domain that is remote from the local domain of the head-end node, the apparatus comprising:
   means for requesting, from the head-end node, reachability information from the tail-end node;
   means for transmitting, from the tail-end node, the reachability information via an Interior Gateway Protocol (IGP) advertisement to a border router of the remote domain (remote border router);
   means for propagating the reachability information with one or more other border routers, at least one of the one or more other border routers being a border router in the local domain (local border router); and
   means for requesting, from the head-end node, that the local border router release the reachability information into the local domain.

9. A computer readable storage medium containing executable program instructions for controlling distribution of reachability information for a tail-end node of a traffic engineering (TE) label switched path (LSP) to a head-end node of the TE-LSP in a computer network, the TE-LSP spanning multiple domains of the network such that the tail-end node resides in a domain that is remote from the local domain of the head-end node, the executable program instructions comprising program instructions for:
   requesting, from the head-end node, reachability information from the tail-end node;
   transmitting, from the tail-end node, the reachability information via an Interior Gateway Protocol (IGP) advertisement to a border router of the remote domain (remote border router);
   propagating the reachability information with one or more other border routers, at least one of the one or more other border routers being a border router in the local domain (local border router); and
   requesting, from the head-end node, that the local border router release the reachability information into the local domain.

10. A method for controlling distribution of inter-domain routing information in a computer network, the method comprising:
   storing inter-domain routing information at one or more border routers, the one or more border routers each contained within a single backbone domain and a respective local domain;
   sharing the inter-domain routing information among the one or more border routers; and leaking the inter-domain routing information from one of the one or more border routers into the respective domain in response to a request from a router within the respective domain for the inter-domain routing information.

11. The method as in claim 10, wherein the inter-domain routing information is selected from the group consisting of: reachability information, Path Computation Element (PCE) Discovery information, and automesh group information.

12. The method as in claim 10, further comprising:
maintaining a controlled distribution table at the one or more border routers, the controlled distribution table indicating whether to distribute the inter-domain routing information into the respective domains.

13. A head-end node for use with controlling distribution of reachability information of a traffic engineering (TE) label switched path (LSP) in a computer network, the TE-LSP spanning multiple domains of the network, the head-end node comprising:
   a network interface to i) send requests for reachability information to a tail-end node of the TE-LSP, the tail-end node residing in a remote domain, and ii) receive advertisements of the reachability information from a border router in a domain local to the node;
   a processor coupled to the network interface to execute software processes; and
   a memory to store a head-end node process executable by the processor, the head-end node process configured to i) establish the TE-LSP to the tail-end node ii) request reachability information from the tail-end node, and iii) request that the reachability information be leaked into the local domain by the border router in the local domain.

14. A tail-end node for use with controlling distribution of reachability information of a traffic engineering (TE) label switched path (LSP) in a computer network, the TE-LSP spanning multiple domains of the network, the tail-end node comprising:
   a network interface to i) receive requests for reachability information from a head-end node of the TE-LSP, the head-end node residing in a remote domain, and ii) send advertisements of the reachability information to a border router in a domain local to the node;
   a processor coupled to the network interface to execute software processes; and
   a memory to store a tail-end node process executable by the processor, the tail-end node process configured to i) establish the TE-LSP from the head-end node ii) generate an advertisement containing reachability information of the node, and iii) send the reachability information to the border router in the local domain.

15. A border node for use with controlling distribution of reachability information of a traffic engineering (TE) label switched path (LSP) in a computer network, the TE-LSP spanning multiple domains of the network, the border node comprising:
   a network interface to i) relay requests for reachability information from a head-end node of the TE-LSP to a tail-end node of the TE-LSP, the tail-end node residing in a domain that is remote from the local domain of the border node and head-end node, ii) s receive advertisements of the reachability information from the tail-end node, and iii) receive requests that the reachability information be leaked into the local domain;
   a processor coupled to the network interface to execute software processes; and
   a memory to store i) reachability information from one or more tail-end nodes, and ii) a border node process executable by the processor, the border node process configured to leak the reachability information of a particular tail-end node of the one or more tail-end nodes in response to a request that the reachability information for the particular tail-end node be leaked into the local domain.

* * * * *

UNITED STATES PATENT AND TRADEMARK OFFICE
CERTIFICATE OF CORRECTION

PATENT NO. : 7,554,996 B2 Page 1 of 1
APPLICATION NO. : 11/226889
DATED : June 30, 2009
INVENTOR(S) : Stefano B. Previdi It is certified that error appears in the above-identified patent and that said Letters Patent is hereby corrected as shown below:

Col. 2, Line 5, please amend as shown:
 BGP peer routers typically includes ~~Destination~~ destination address pre- Col. 17, Line 51, please amend as shown:
 ~~Ti)~~, T1), as will be understood by those skilled in the art. Once the Col. 22, Line 23, delete "ii) s receive advertise-", substitute -- ii) receive advertise- --

Signed and Sealed this

Thirteenth Day of October, 2009

David J. Kappos
*Director of the United States Patent and Trademark Office*